United States Patent [19]

Siegwart

[11] 4,261,380

[45] Apr. 14, 1981

[54] FLOW REGULATOR HAVING DAMPING MEANS

[76] Inventor: Emil Siegwart, Michael-Blatter-Straße 6,D-6603, Sulzbach-Neuweiler, Fed. Rep. of Germany

[21] Appl. No.: 64,533

[22] Filed: Aug. 7, 1979

[30] Foreign Application Priority Data

Aug. 10, 1978 [DE] Fed. Rep. of Germany ....... 2835052

[51] Int. Cl.³ .............................................. F16K 15/03
[52] U.S. Cl. ..................................... 137/514; 137/521
[58] Field of Search ...................... 137/521, 527–527.8, 137/514, 514.5

[56] References Cited

U.S. PATENT DOCUMENTS

| | | | |
|---|---|---|---|
| 3,559,679 | 2/1971 | Smirra | 137/521 X |
| 3,965,928 | 6/1976 | Siegwart | 137/521 X |
| 3,996,961 | 12/1976 | Siegwart | 137/517 |
| 4,124,037 | 11/1978 | Siegwart | 137/521 |
| 4,194,527 | 3/1980 | Schonwald et al. | 137/514 X |

FOREIGN PATENT DOCUMENTS

1313310  11/1962  France .

*Primary Examiner*—William R. Cline
*Attorney, Agent, or Firm*—Peter K. Kontler

[57] ABSTRACT

An arrangement for regulating the flow of a gaseous medium in a conduit includes a flap valve pivotably mounted in the conduit and biased by a spring toward its open position and by the pressure of the gaseous medium flowing through the conduit towards its closing position. A rod-shaped member is pivotally mounted on one section of the flap valve, and a sleeve-shaped member is pivotally mounted on a plate-shaped element rigid with the conduit and extending axially thereof downstream of the flap valve. The sleeve-shaped member has a passage therein in which the rod-shaped member is received with play so that, upon rapid movement of the rod-shaped member in the passage, the sleeve-shaped member is entrained by friction on pivots, thus seizing the rod-shaped member. In this manner, the flap valve is prevented from fluttering, while its responsiveness to gradual pressure changes of the gaseous medium is unaffected.

11 Claims, 3 Drawing Figures

FLOW REGULATOR HAVING DAMPING MEANS

BACKGROUND OF THE INVENTION

The present invention relates to an arrangement for regulating the flow of a gaseous medium in a conduit in general, and more particularly to an arrangement of this type wherein the amount of the gaseous medium permitted to flow through the conduit is controlled in dependence on the pressure of the gaseous medium.

There are already known several arrangements of the above-mentioned type. In some of these arrangements, a flap valve is mounted in the conduit for pivoting between an open and a closed position, is urged toward its open position by a spring, and is urged towards its closed position by the action of the flowing gaseous medium thereon. So, for instance, it is already known to mount the flap valve on a shaft which is located close to but offset from the axis of the conduit, and to construct the flap valve with two sections which are integral with one another and each of which extends to one side of the shaft, these two sections enclosing an obtuse angle with one another. The gaseous medium will exert a different force on each of these sections, owing to the offsetting of the shaft and the angular configuration of the flap valve. In this manner, the flap valve will gradually approach its closed position as the pressure of the gaseous medium upstream of the flap valve increases.

Experience with conducting systems for gaseous media has shown that such systems are always prone to resonate at certain frequency ranges, for instance, due to excitation of oscillations due to periodic detachment of the flow at certain locations of the conducting system. The excitation and resonance conditions occur, as a rule, in certain pressure and through-put ranges.

The resonance oscillations have the unpleasant consequence that the function of the flow-regulating arrangement is detrimentally influenced. They cause the regulating flap valves, which should automatically adjust themselves to the equilibrium between the spring force acting on the respective flap valve, on the one hand, and the forces which the flowing gaseous medium subjects the flap valve, and which should remain in this adjusted regulating position until any change occurs in the forces to which the flowing gaseous subjects the valve, to flutter or oscillate about this adjusted regulating position.

This undesirable phenomenon is of particular significance in the regulating arrangement according to the U.S. Pat. No. 3,965,928, inasmuch as this regulating arrangement is characterized by an extraordinarily high sensitivity to pressure variations. Therefore, there were already proposed, in the U.S. Pat. Nos. 3,996,961 and 4,124,037, certain measures for avoiding or at least damping the fluttering or oscillating movement. These measures have been proven to be effective under many circumstances. So, for instance, if the conduit diameter is less than 100 mm, these measures are sufficient under most circumstances. However, it has been established that once the conduit dimensions, and hence the dimensions of the flap valve, are greater than that, and especially when the diameter of the conduit is between 140 mm and 160 mm, the flap valve has nevertheless a certain tendency to "float", so that further damping means have to be provided.

There are already known pneumatic damping members which could be utilized for this purpose. These damping members which, for instance, include a pneumatic cylinder which is equipped with a throttled air supply and discharge are, however, expensive and relatively sensitive.

OBJECTS AND SUMMARY OF THE INVENTION

Accordingly, it is the general object of the present invention to avoid the disadvantages of the prior art.

More particularly, it is an object of the invention to provide a flow-regulating arrangement for gaseous media which is not possessed of the above-discussed disadvantage of the prior-art arrangements of this type.

Still another object of the invention is to so construct the flow-regulating arrangement that the deleterious effect of pressure variations of the gaseous medium on the positional stability of the flap valve of the flow-regulating arrangement is eliminated or at least suppressed.

A concomitant object of the invention is to develop a voltage regulating arrangement of the type here under consideration which is simple in construction, inexpensive to manufacture, easy to maintain and operate, and reliable nevertheless.

In pursuance of these objects and others which will become apparent hereafter, one feature of the present invention resides in an arrangement for regulating the flow of a gaseous medium in a conduit which, briefly stated, comprises a flap valve mounted in the conduit for displacement between an open and a closed position and urged by the gaseous medium toward the latter; means for biasing the flap valve toward the open position thereof; and means for controlling the response of the flap valve to pressure variations in the gaseous medium, including a sleeve-shaped first member bounding a through passage, a rod-shaped second member slidably received in the passage of the first member, and means for connecting one of the members to the flap valve and the other members to the conduit for axial and also angular movement of the first member relative to the second member. The passage has an axial length which is limited to such an extent that the friction between the two members causes the first member to move angularly relative to the first member and to seize the latter at least when the force to which the flap valve subjects the controlling means exceeds a predetermined limit.

As a result of the seizing or clamping action, there is obtained a friction force, even at low friction coefficients, of a magnitude sufficient to hold the flap valve against the forces causing the fluttering or oscillatory movement, or at least to yield to such forces only so slowly that they cannot become decisively effective any longer. Nevertheless, the regulating function of the flap valve is not impaired. This is attributable to the fact that the changes in the level of pressure of the gaseous medium, and the reaction thereto of the flap valve by changing its position, take place over a period of time which is greater by at least one order of magnitude than those of the pressure variations which would cause the oscillatory or fluttering movement of the flap valve. For such long-term changes, the controlling means can yield before there is encountered an escallation in the friction force due to the clamping or seizing effect, which latter would further increase the frictional force, so that the degree of seizing would again increase and so on. On the other hand, other loosening influences, such as vibrations, get an opportunity to become effective.

Be it as it may, experiments with the arrangement of the present invention have shown that the new damping arrangement proposed herein is extraordinarily effective and does not detrimentally influence the proper operation of the flow-regulating arrangement.

It is particularly advantageous when the above-discussed concept is employed in a flow-regulating arrangement wherein the flap valve is mounted in the conduit for pivoting, in which case the connecting means of the controlling means includes an articulated connection of the sleeve-shaped member, on the one hand, and of the rod-shaped member, on the other hand, either to the flap valve or to the conduit. Advantageously, the flap valve is mounted on a shaft which is situated close to and offset from the center of the conduit. It is especially advantageous when the flap valve includes two sections, each located at one side of the shaft and enclosing an obtuse angle with one another such that one of the sections extends from the shaft substantially axially of the conduit in the open position and inclinedly downstream in the closed position, while the other section extends from the shaft inclinedly upstream in the open position and substantially normal to the conduit axis in the closed position.

In order to avoid the possibility of a complete blockage, it is proposed in accordance with an advantageous feature of the present invention that the extent of the angular movement of the first member relative to the second member be limited by providing at least one abutment on the first member at an axial distance from the passage.

A further advantageous development of this facet of the present invention is obtained when the first member is formed with a bore which includes a confining portion constituting the before-mentioned passage, and at least one portion of a diameter exceeding that of the confining portion, situated axially adjacent to the latter, and having an edge at the open end of which constitutes the abutment.

It is currently preferred to so construct the sleeve-shaped first member that the bore includes another end portion similar to the aforementioned end portion and situated across the confining portion from the same, the other end portion having a further edge at the open end thereof which constitutes another abutment.

In many instances, these last-discussed measures will not even be necessary, especially when the first member has an axial length which is sufficient, in relation to the diameter of the rod-shaped second member and the play between the rod-shaped second member and the sleeve-shaped first member, to maintain the angle of movement of the first member relative to the second member within acceptable limits.

The material of at least that portion of the first member which circumferentially bounds the passage is of a synthetic plastic material, such as nylon or polytetrafluoroethylene. It is preferred when this material is at least limitedly elastically deformable. It is further currently preferred when the above-mentioned connecting means connects the second member to the other section of the flap valve, and connects the sleeve-shaped member to a plate-shaped element which is arranged downstream of the shaft and substantially axially of the conduit and rigidly connected to the latter. The plate-shaped element has a downstream edge which advantageously substantially conforms as to the position and contoure thereof with respect to the flow of the gaseous medium to that of the one section of the flap valve in a middle opening position of the latter.

The novel features which are considered as characteristic of the invention are set forth in particular in the appended claims. The improved flow-regulating arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
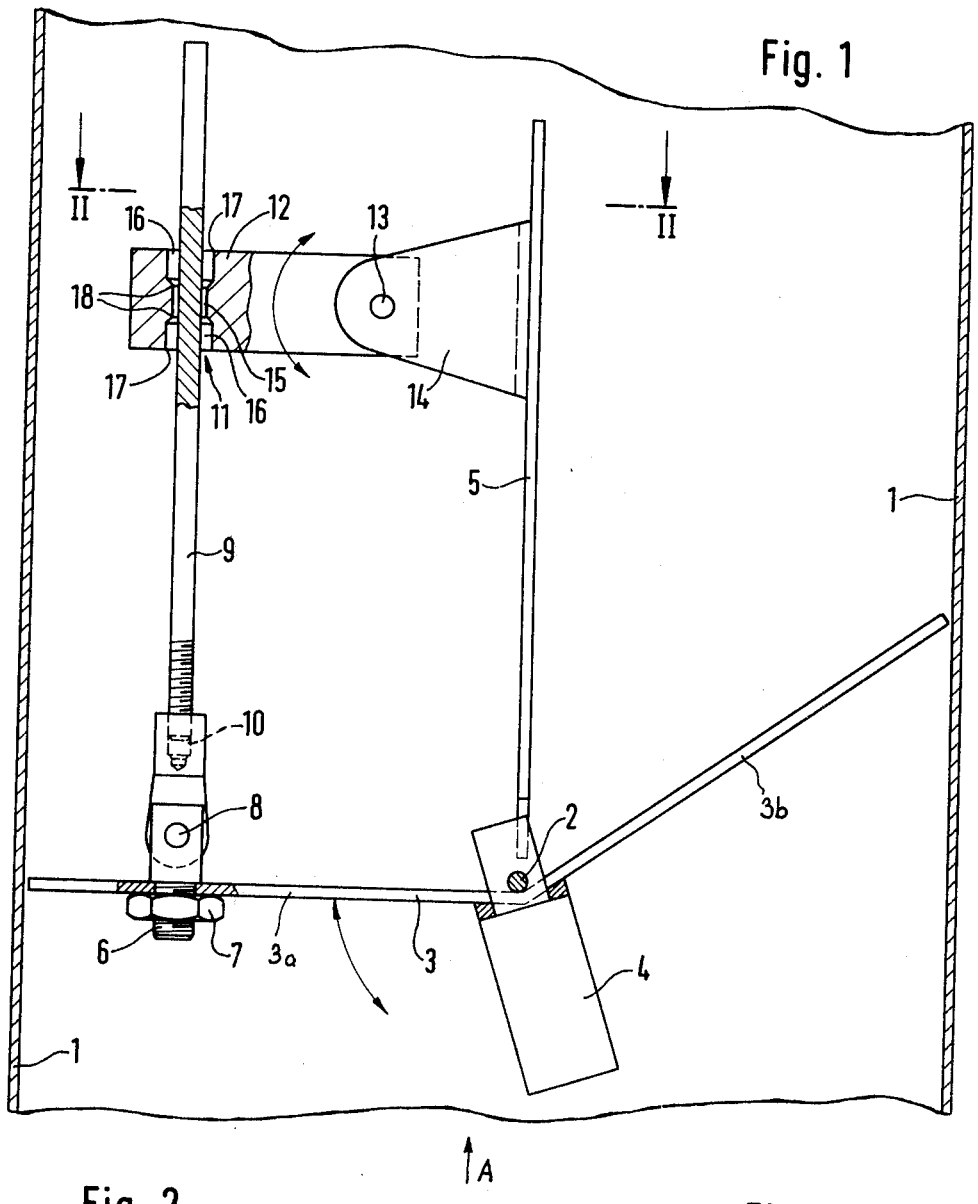
FIG. 1 is a partially axially sectional view of a fragment of a conduit incorporating the flow-regulating and oscillation-damping arrangement of the present invention.
Figures 2, 3:
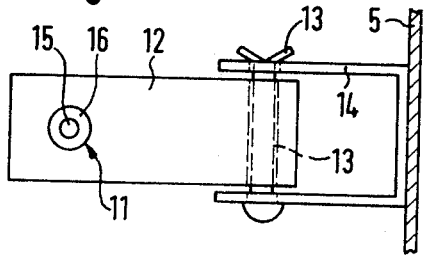
FIG. 2 is a partially sectional view taken on line II—II of FIG. 1.
FIG. 3 is a view of a detail of FIG. 1 in different position of the illustrated components with respect to one another.

Referring now to the drawing in detail, and first to FIG. 1, it may be seen that reference numeral 1 has been used to indicate a conduit, such as an air-conveying conduit. The conduit 1 has a tubular, preferably cylindrical, configuration centered on a longitudinal axis of the conduit 1. A shaft 2 extending transversely of the conduit 1 is situated at a small distance from the longitudinal axis of the conduit 1. A flap valve 3 is supported on the shaft 2. The flap valve 3 includes two sections 3a and 3b which are integral with one another and which enclose an obtuse angle of about 150° with each other. The flap valve 3 is connected to the shaft 2 by means of clamping connectors 4 which form no part of the present invention and hence need not be discussed here in any great detail. Upstream of the region of the merger of the sections 3a and 3b (the direction of flow of a gaseous medium through the conduit 1 being indicated by an arrow A), the clamping connectors 4 are constructed as cylindrical counter weights which transfer the vertical plane in which the center of gravity of the flap valve 3 is located into coincidence with the axis of the shaft 2 for the combination of the flap valve 3 with clamping connectors 4.

The shaft 2 is supported in bearings which are mounted on the conduit 1 and which have not been illustrated in order not to unduly encumber the drawings. These bearings may be of the type disclosed in the U.S. Pat. No. 4,124,037, the entire contents of which is incorporated herein by reference. A non-illustrated spring of a conventional construction, such a spring arranged similarly to that used in U.S. Pat. No. 3,996,961, acts on the flap valve 3 and urges the same away from the closing position which is illustrated in FIG. 1 into an open position in which the section 3b extends in a parallelism with the axis of the conduit 1 downstream from the shaft 2, and the section 3a of the flap valve 3 extends inclinedly upstream from the shaft 2.

A plate-shaped element 5 extends downstream from the shaft 2 and along a common plane therewith in the axial direction of the tubular conduit 1. The plate-shaped element 5 is constructed in the manner which is shown in the aforementioned U.S. Pat. No. 4,124,037, the disclosure of which as to this aspect is incorporated herein by reference as well. The plate-shaped element 5 has a rectangular upstream portion which uninterruptedly extends all of the way across the conduit 1, and an adjacent downstream portion which is bounded by a downstream edge that has a substantially semicircular contour. This downstream contour of the plate-shaped element 5 constitutes a conformal configuration with respect to the flow of the gaseous medium to that of the section 3b of the flap valve 3 in a central position of the latter. In this manner, the space between the plate-shaped element 5, the section 3b of the flap valve 3, and the internal surface of the conduit 1 is enclosed as far as the flow pattern of the gaseous medium is concerned so that, as a consequence thereof, this space is substantially devoid of turbulences which could subject the flap valve 3 to disturbing forces.

Because of its construction, the flap valve 3 regulates the flow of the gaseous medium through the conduit 1 in such a manner that, at different pressures of the gaseous medium, the volumetric flow rate of the gaseous medium remains the same, in that the flap valve 3 closes the flow-through cross-sectional area of the conduit 1 to a greater or lesser extent under the influence of the gaseous medium which flows past it and acts thereon.

As described so far, the flow-regulating arrangement is known from the above-identified U.S. Patents.

A pivoting joint 8 is connected to the section 3a of the flap valve 3 by means of a threaded bolt 6 and a nut 7. A rod-shaped member 9 is connected to the moveable part of the joint 8 at 10, such as by being threaded into a tapped bore of the moveable part. The rod-shaped member 10 is received in and extends through a bore 11 provided in an elongated sleeve-shaped member 12. The sleeve-shaped member 12 is preferably made of a synthetic plastic material and has a rectangular, such as a square, configuration. The sleeve-shaped member 12 is connected, by means of a split pin 3, to a U-shaped bracket 14 which is rigidly connected to the plate-shaped element 5, for pivoting relative thereto.

The bore 11 is subdivided into a central portion 15 which embraces the rod-shaped member 9 with only small play (which has been illustrated in an exaggerated manner), and two enlarged end portions 16 which adjoin the central portion 15 at the respective axial sides thereof. The reference numeral 17 is used to indicate the end edges of the enlarged end portions 16, while the end edges of the central portion 15 of the bore 11 are indicated by the reference numeral 18.

Having so described the construction of the arrangement of the present invention, the operation thereof will now be discussed.

As mentioned before, the flap valve 3 is acted upon by the gaseous medium flowing through the conduit 1 and will change its position in dependence on the pressure variations of the gaseous medium flowing through the conduit 1. When the flap valve 3 moves (pivots about the axis 2), the rod-shaped member 9 slides in the bore 11. As a result of the friction between the rod-shaped member 9 and the surface of the sleeve-shaped member 12 which bounds the central portion or passage 15 of the bore 11 in which it is guided, the rod-shaped member 9 entrains the sleeve-shaped member 12 for joint movement, which means that the sleeve-shaped member 12 is angularly displaced about the split pin 13. As a result of this, the sleeve-shaped member 12 seizes the rod-shaped member 9, in that the end edges of the central portion 15 of the bore 11 are pressed against the rod-shaped member 9.

When the movement of the rod-shaped member 9 is relatively slow, as it is when the regulating position of the flap valve 3 is changed, the pressing force between the end edges 18 and the rod-shaped member 9 does not reach any high value. Hence, the rod-shaped member 9 skids past the edges 18 either initially, or due to the action of vibrations which almost invariably exist in the conduit 1. On the other hand, when the movement of the rod-shaped member 9 is rapid, as it would be during fluttering movements of the flap valve 3, the sleeve-shaped member 12 is displaced angularly to a greater extent so that the extent of seizing or jamming is more pronounced. As a result of this, the pressing forces between the end edges 18 and the rod-shaped member 9 achieved higher magnitudes which, in turn, results in an even higher degree of angular displacement of the sleeve-shaped member 12 about the split pin 13 and so on, until the rod-shaped member 9 comes into contact with the end edges 17. The provision of these end edges 17 renders it possible to limit the resulting friction forces to a desired value. Furthermore, the material of the sleeve-shaped member 12 and/or of the rod-shaped member 9 can be so selected as to take the desired friction coefficient into consideration.

Excellent results were obtained even when the above-discussed flow-regulating arrangement had a somewhat simpler construction, especially of the sleeve-shaped member 12, in that the bore 11 of the sleeve-shaped member 12 had a constant diameter throughout, that is, when no enlarged portions 16 were provided. So, under these circumstances, the rod-shaped member 9 had a diameter of 2.5 mm and was embraced by the sleeve-shaped member 12, with a play of 1/20 to 1/10 mm along a zone of a length approximately corresponding to 3 times the diameter of the rod-shaped member 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. An arrangement for regulating the flow of a gaseous medium in a conduit, comprising a flap valve mounted in the conduit for displacement between an open and a closed position and urged by the gaseous medium toward the latter; means for controlling the response of said flap valve to pressure variations in the gaseous medium, including a sleeve-shaped first member bounding a through passage, a rod-shaped second member slidably received in said passage of said first member, and means for connecting one of said members to said flap valve and the other member to the conduit for axial and also angular movement of said first member relative to said second member, said passage having an axial length which is limited to such an extent that the friction between said members causes said first member to angularly move relative to said first member and to seize the latter at least when the force to which said flap valve subjects said controlling means exceeds a predetermined limit.

2. The arrangement as defined in claim 1, wherein said controlling means further includes means for limiting the extent of the angular movement of said first member relative to said second member, including at least one abutment provided on said first member at an axial distance from said passage.

3. The arrangement as defined in claim 2, wherein said first member has a bore including a confining portion constituting said passage, and an end portion of a diameter exceeding that of said confining portion situated axially adjacent to the latter and having an edge at the open end thereof which constitutes another abutment.

4. The arrangement as defined in claim 2, wherein said bore further includes another end portion similar to said end portion and situated across said confining portion from said end portion, said other end portion having a further edge at the open end thereof which constitutes another abutment.

5. The arrangement as defined in claim 1, wherein said first member has a portion which circumferentially bounds said passage, at least such portion of said first member being of a synthetic plastic material.

6. The arrangement as defined in claim 5, wherein said synthetic plastic material is elastically deformable.

7. The arrangement as defined in claim 1, wherein said flap valve is mounted in the conduit for pivoting; and wherein said connecting means of said controlling means includes an articulated connection for each of said members.

8. The arrangement as defined in claim 7, further comprising means for pivotally mounting said flap valve in the conduit, including a shaft situated close to and offset from the center of the conduit; and wherein said flap valve includes two sections, each located at one side of said shaft and enclosing an obtuse angle with one another such that one of said sections extends from said shaft substantially axially of the conduit in said open position and inclinedly downstream in said closed position, while the other section extends from said shaft inclinedly upstream in said open position and substantially normal to the conduit axis in said closed position.

9. The arrangement as defined in claim 8, wherein said connecting means connects said second member to said other section of said flap valve.

10. The arrangement as defined in claim 8, wherein said connecting means includes a plate-shaped element arranged downstream of said shaft and substantially axially of the conduit and rigidly connected to the latter.

11. The arrangement as defined in claim 10, wherein said plate-shaped element has a downstream edge which substantially conforms as to the position and contour thereof with respect to the flow of the gaseous medium to that of said one section of said flap valve in a middle opening position of the latter.

* * * * *